July 30, 1963
C. KIMBLETON
3,099,783
VOLTAGE REGULATING SYSTEM
Filed March 1, 1962
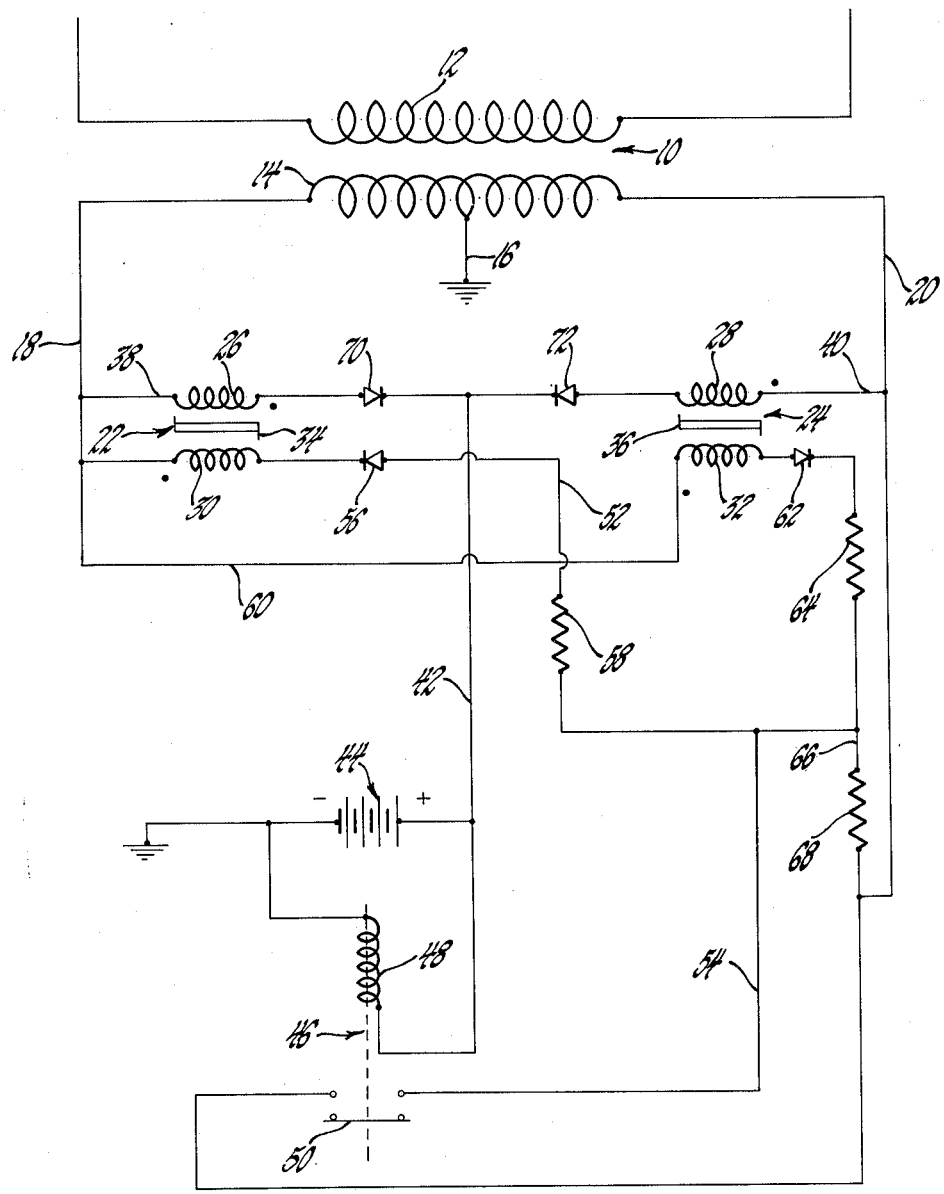
INVENTOR.
Cecil Kimbleton
BY
Dale A. Winnie
ATTORNEY

United States Patent Office 3,099,783
Patented July 30, 1963

3,099,783
VOLTAGE REGULATING SYSTEM
Cecil Kimbleton, Utica, Mich., assignor to Curtiss-Wright Corporation, Utica, Mich., a corporation of Delaware
Filed Mar. 1, 1962, Ser. No. 176,733
1 Claim. (Cl. 320—40)

This invention relates to means for regulating the voltage applied to a power supply line from an electrical generator or other power supply source and particularly to means for regulating such voltage for storage battery charging purposes.

Automotive and other vehicles normally make use of a low voltage direct-current generator for storage battery charging purposes. The generator is usually driven by the vehicle engine and accordingly generates a variable voltage and current in accord with the output speed of the vehicle engine. This requires some means of voltage or current regulation to preclude damage to the storage battery and related circuitry.

The voltage or current regulating means used must be effective in completing the circuit between the generator and the storage battery when the battery requires charging. It must also interrupt the circuit when the battery is fully charged or when battery current is required to be discharged through the generator. In some instances the regulator may be required to maintain the terminal voltage of the generator substantially constant and to limit the generator output to a certain level.

Most voltage regulators include one or more vibrating contact relay. Such contact relays are normally provided within the generator field winding or other control circuit where they are not subjected to full generator output current which may cause pitting, sticking and ultimately failure of the contact points. However, when the generator output is dependent upon substantial field current variations even this is insufficient protection. Further, in the majority of instances where the relay is required to operate in a vibratory manner, and in a resulting highly inductive circuit, mechanical and electrical failures are to be expected.

A further disturbing factor in present battery charging systems having a variable speed generator driving force, such as a vehicle engine, is the variable battery charging rate to be taken into consideration. When the vehicle engine is idling the battery normally recharges slowly; particularly when other electrical accessories continue to make a drain on the power available.

It is an object of this invention to provide a voltage regulating system wherein the voltage applied to a power supply line may be effectively controlled by a conventionally known contact relay without damage thereto.

It is a further object of this invention to provide a voltage regulating system particularly adapted for use with inductor-generator and wherein the voltage applied to a power supply line is independent of field current variation in the generator.

It is another object of this invention to provide a voltage regulating system particularly adapted for use with A.C. power supply sources.

A further object in this latter regard is to provide a voltage regulating system for use with alternator generators driven by a variable speed source, such as a vehicle engine, and wherein the voltage applied to a power supply line, as for battery charging purposes, may be maintained essentially constant despite driving source speed changes.

A still further object of this invention as used to regulate the voltage applied to a power supply line for storage battery charging purposes, is to provide a regulatory system wherein the charging current may be held essentially constant despite increases in the magnitude of the source voltage.

These and other objects and advantages to be gained in the practice of this invention will be more apparent upon a reading of the following specification relating to a preferred embodiment of this invention and referring to the accompanying drawing.

In the drawing the single FIGURE view is the preferred embodiment of this invention as used for storage battery charging purposes.

In brief, the voltage regulating system of this invention, as used for storage battery charging purposes, contemplates the use of an inductor-alternator generator. The output winding of the generator is center-tapped and has respectively opposite sides thereof connected directly to a storage battery through the current conductive windings of saturable core type magnetic amplifiers. The control windings of the amplifiers are connected to respectively opposite sides of the center-tapped output winding and by means of a low differential voltage sensitive relay across the battery, and operatively connected in circuit with the control windings, they are capable of accomplishing the required regulation. This, essentially, is through producing a high inductance in the current conductive coils of the saturable core magnetic amplifiers when the battery is nearly fully charged and thereby allowing only minimum current flow to the battery.

Referring to the single FIGURE drawing in further detail, the inductor-alternator 10 is shown to include a field winding 12 and an output or power winding 14. The output winding is center-tapped and connected to ground by the lead 16. Output leads 18 and 20 are connected to opposite ends of the center-tapped winding and are connected through saturable core magnetic amplifiers 22 and 24 to the storage battery 44.

The saturable core magnetic amplifiers 22 and 24 include battery charging current conductive windings (gate windings) 26 and 28, control windings 30 and 32, and saturable cores 34 and 36, respectively.

The windings or coils 26 and 28 of the magnetic amplifiers, which carry the battery charging current, are provided in circuit lines 38 and 40, respectively, which are in turn connected to a common line 42 leading directly to the storage battery 44.

A low differential voltage sensitive relay 46 is operatively disposed across the storage battery 44. The relay is of the conventionally known vibrating contact type. A solenoid coil 48 is provided in parallel with the battery and a normally open solenoid responsive contact 50 is disposed in a separate circuit later described.

The control winding 30 of the amplifier 22 is connected in a circuit line 52 between the power output lines 18 and 20. A line 54 having the battery voltage sensitive relay 46 and a resistor 68 are shunted across the circuit line 52. The resistor 68 requires current flow through the circuit line 54 to the output lead 20 as will be shown.

A diode rectifier 56 is provided in the circuit line 52 to prevent battery charging current from the output lead 18 when positive from traveling through the control winding 30 and causing a reduced impedance in coil 26 as by saturation of the core 34. The resistance 58 is in line 52 to minimize circulating currents between the control windings of the magnetic amplifiers and for holding the control winding current to a minimum level.

The control winding 32 is provided in circuit line 60 connected between the output leads 20 and 18 and has the voltage sensitive relay line 54 also shunted thereacross. A diode rectifier 62 and resistance 64 are provided in the circuit line 60 for like reasons as mentioned with respect to the other control winding 30 and as regards the output winding lead 20.

The blocking resistor 68 is of higher value than either of the resistors 58 or 64 and is provided in a circuit line 66 common to both of the circuit lines 52 and 60. The relay sensitive circuit line 54 is actually shunted across the resistor 68 and accordingly serves both circuit lines 52 and 60.

Suitable diode rectifiers 70 and 72 are provided in the gate winding circuit lines 38 and 40, respectively, to pass battery charging current to the common line 42 and resist current flow in the opposite direction.

The diode rectifiers 56 and 62 prevent current flow through the control windings 30 and 32, respectively, when the current flow is positive in the respective current conductive or gate windings 26 and 28. Such current flow, as will be appreciated would cause a reset of the magnetic amplifiers and the lack of control thereover except for such minimizations of current as would be effected by the resistances 58 and 64 in the respective control winding circuit lines 52 and 60.

The resistances 58 and 64 are intended principally to prevent circulating currents between the control winding circuit lines 52 and 60. Such circulating currents could cause the magnetic amplifiers to be reset and would interfere with the control thereof. With the resistors in circuit as described, the current flow is through the common lead of the relay circuit 54 to the lead 20, as regards the control circuit 60 (shunted therethrough by resistance 68), and through the path of least resistance back into the positive side of the power winding 14, via the lead 18, as regards the control circuit 52.

In the storage battery charging system just described the cores 34 and 36 will impose a high reactance against current flow in the coils 26 and 28 when the cores are unsaturated and they will impose a minimum resistance to current flow when they are saturated. The control windings 30 and 32 are accordingly used to reset the system by unsaturating the cores when the battery is fully charged and it becomes desirable to minimize the flow of further charging current to the battery 44.

When the potential of battery 44 is below full charge the relay 46 will tend to open. However, the positive going half cycles of the alternator generator output winding 14 tend to overcome the initial reactance of the unsaturated cores 34 and 36 and to keep applying a charging current to the storage battery.

When the battery is nearly fully charged the relay 46 will be closed and a current flow will be permitted through the control windings 30 and 32 which will unsaturate the cores 34 and 36 and again impose a high reactance precluding excessive battery charging current flow to the storage battery 44.

The relay 46 proportions the time between maximum and minimum charge currents so that the average terminal voltage across the battery 44 is maintained essentially at the setting of the relay. This condition adjusts the charging current to the needs of the battery.

The relay 50 can be such as will close at a definite and predesignated voltage level across the storage battery 44. This voltage level is a function of the internal battery voltage plus the voltage produced in the battery, that is the IR drop, due to charging current. Thus the resistors 58 and 64 can be such as will not allow the control windings to be completely reset and the relay will continue to function in its normal vibratory manner but subject to very minimum current flow.

The magnetic amplifiers 22 and 24 afford a convenient and relatively inexpensive means for having a significantly smaller current serve as a control for a relatively larger battery charging current. In combination with the voltage sensitive relay 46 they are able to maintain the desired average charging current to the battery and still have the relay itself, while in the output circuit of the power supply source, protected against excessive currents.

The power level in the control or reset circuit is so low that neither mechanical nor electrical wear on the relay contacts is of significance.

Although the driving source may change speed as much as six to one, it has been found that the battery charge rate may be held essentially constant. Further, the charging current may be maintained constant even though the magnitude of the source voltage varies as much as two to one.

I claim:

A voltage regulating system for storage battery purposes and other concurrent uses, to be connected to an A.C. power source having an output winding provided with a first and a second end terminal and with a center tap, said system comprising:

(a) saturable reactor type magnetic amplifier means having first and second control windings and respectively associated first and second battery-charging-current-carrying gate windings, (b) a voltage sensitive relay having
- (b1) a relay coil across which the battery is to be shunted, one end of the relay coil being connectable to said center tap, and
- (b2) a movable contact responsive to said relay coil to open and close, (c) a first and a second charging-current-carrying circuit path, each connectable at one end to the like-numbered one of said end terminals, the other ends being commoned together and to the remaining end of said relay coil, each circuit path including:
- (c1) the like-numbered one of said gate windings and
- (c2) a diode rectifier, the diode rectifiers being poled so that the current flowing to said relay coil is unidirectional, (d) a first and a second control current circuit path connected in shunt with each other, with one set of commoned ends connected to said first end terminal, each such circuit path including:
- (d1) the like-numbered control winding with winding sense relative to the associated like-numbered gate winding appropriate for battery voltage regulation, and
- (d2) a rectifier diode that is poled opposite to the rectifier diode included in the like-numbered charging-current circuit path, and (e) a resistor shunting said movable contact and interconnecting said second terminal and the remaining set of commoned ends of said control current circuit paths.

References Cited in the file of this patent

UNITED STATES PATENTS

| | | |
|---|---|---|
| 2,423,134 | Winkler | July 1, 1947 |
| 2,631,268 | Ransom et al. | Mar. 10, 1953 |
| 2,660,702 | Arvidsson | Nov. 24, 1953 |

OTHER REFERENCES

"The Amplistat—A Magnetic Amplifier," by R. E. Morgan, Electrical Engineering, vol. 68, No. 8, August 1949.